Patented May 30, 1944

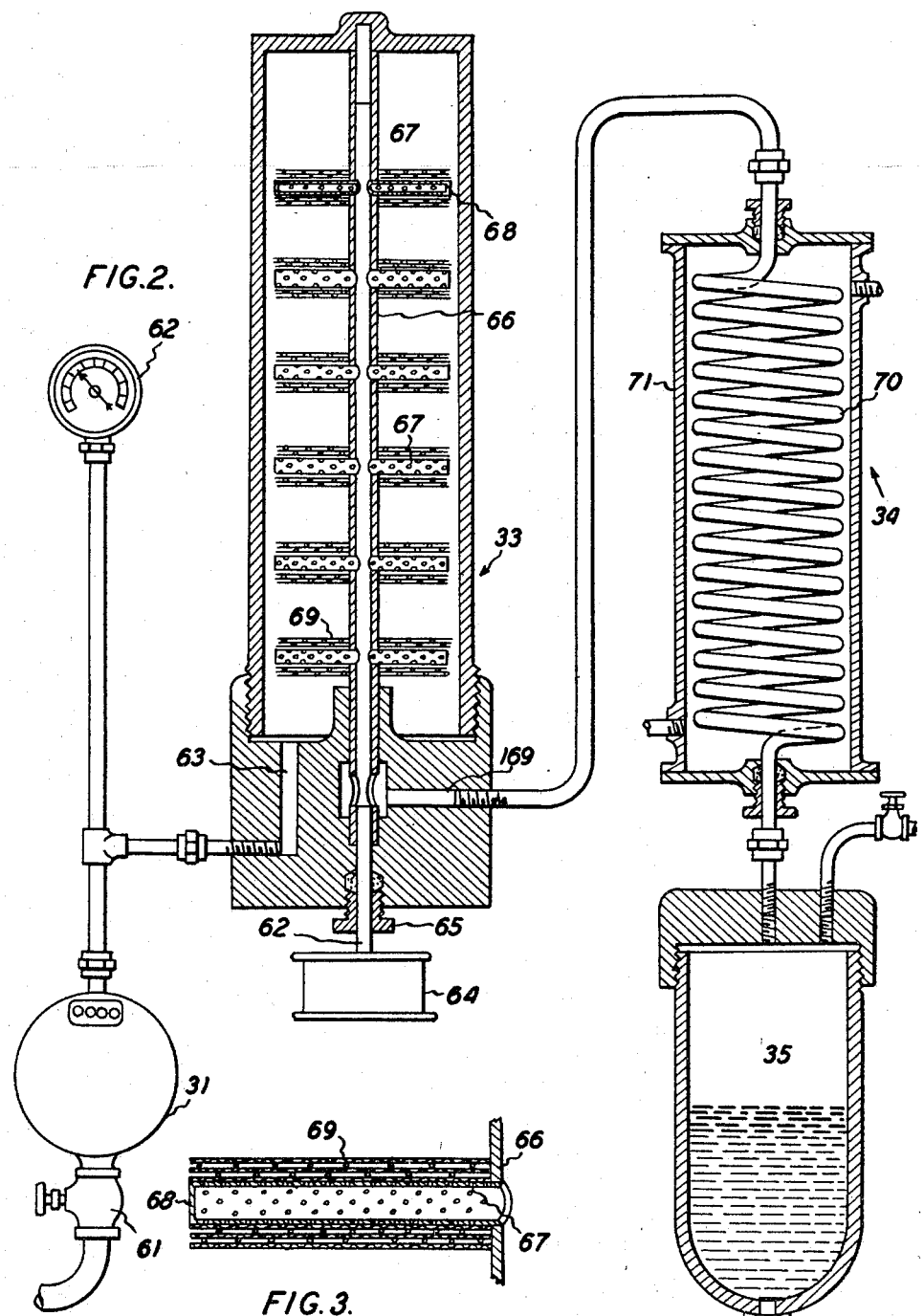

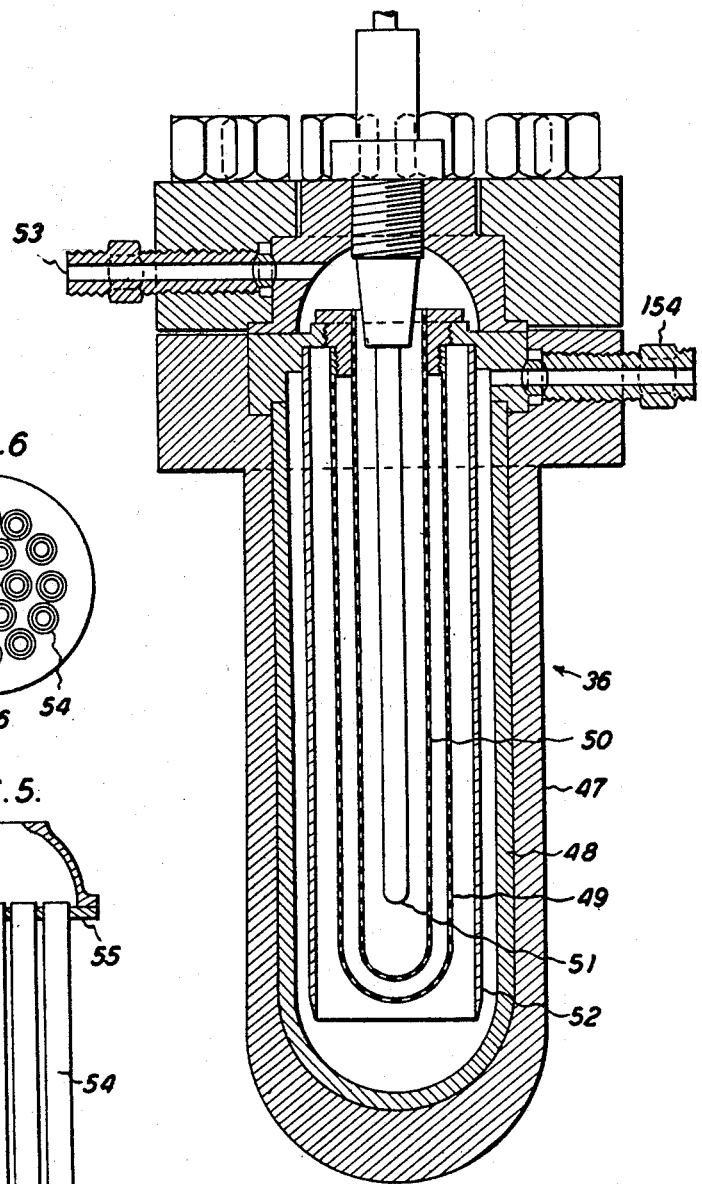
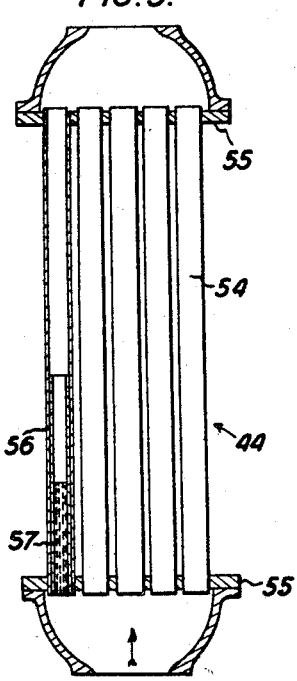
FIG. 6.
FIG. 5.
FIG. 4.

2,349,915

UNITED STATES PATENT OFFICE 2,349,915

PROCESS FOR SYNTHESIS OF HYDROCARBONS, ALCOHOLS, AND FORMALDEHYDE

Paul Xavier Spillane, Ashfield, near Sydney, New South Wales, Australia, assignor to Keith Williams, Wahroonga, near Sydney, Philip Ring, Sydney, and Thomas Andrew Lawrie, Killara, near Sydney, New South Wales, Australia Application April 22, 1940, Serial No. 331,067
In Australia April 29, 1939

5 Claims. (Cl. 204—168)

This invention has for its object the provision of a simple process and apparatus for the manufacture synthetically of hydrocarbons from carbonaceous materials such as coal, wood, shale, rubber, or cotton.

Referring to the accompanying drawings—

Fig. 2 is a vertical section through a catalyst poison-removing apparatus herein referred to as a "small catalyser" and marked 33 in Fig. 1;

Fig. 3 is an enlarged section through an arm of the apparatus shown in Fig. 2;

Figure 1:
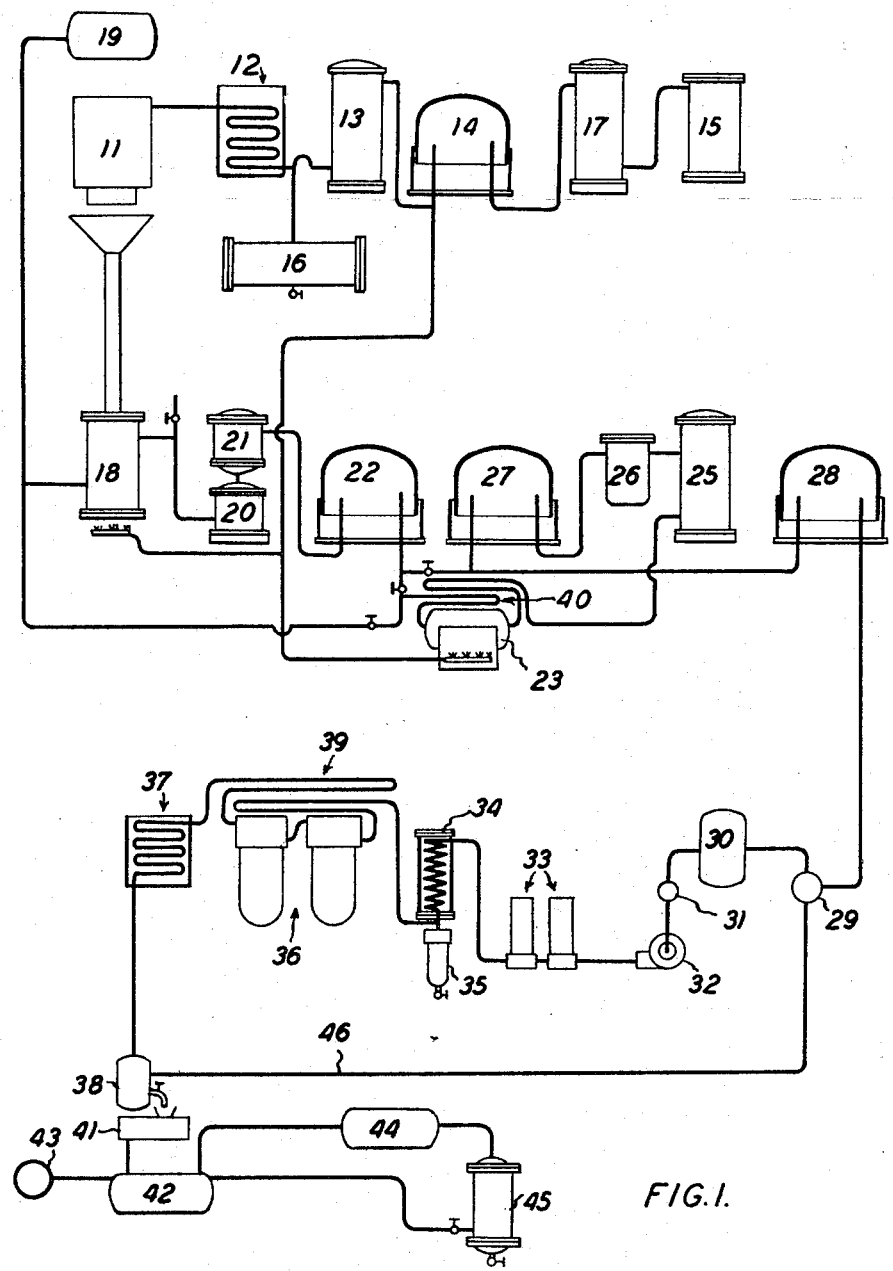
Fig. 1 is a schematic lay-out of apparatus forming a part of the present invention.

Fig. 4 is a vertical section through a chamber which houses electrodes for the establishment therein of a high frequency electric field. This chamber is referred to herein as a "large catalyser" and is marked 36 in Fig. 1; and Figs. 5 and 6 are vertical and horizontal sections of the catalytic chamber marked 44 in Fig. 1.

The carbonaceous material is first charged into a retort 11 where it is destructively distilled. The vapours are passed through a condenser 12 where all the condensable products are removed and the incondensable gas is passed through a scrubber 13 into a first gas holder 14. The condensable products are collected at 16, fractionated, and retreated to obtain the numerous products resulting from the destructive distillation. The heat required for that distillation is supplied by gas from a gas producer 15. This producer feeds gas through a scrubber 17 into the first gas holder from which gas for the power and heat requirements of the entire plant are taken.

The carbonaceous residue from the retort is charged into a water gas generator 18. This water gas generator is externally heated and produces water gas containing any desired proportion of hydrogen:carbon monoxide, continuously. This proportion is determined by adjustment of the temperature at which the generator is operated by external heat taken as producer gas from the holder 14. The hot flue gases are passed from the heating zone into a waste heat boiler 19, where they are used to generate steam to feed the water gas generator 18 and any other parts of the plant requiring steam. The hot flue gases from the destructive distillation furnace are also passed through this waste heat boiler and used for the same purpose. If desired, a conventional intermittent water gas generator may be used with this plant.

The water gas is passed from the generator 18 through a gas scrubber 20 and a gas purifier 21 into a second gas holder 22. An approximate ratio of hydrogen:carbon monoxide in this gas mixture is 1:1.

Some of the gas from the second holder is used for the generation of hydrogen. This hydrogen is generated by taking water gas from the second holder 22, mixing it with steam from the waste heat boiler 19, and passing the mixture over a catalyst maintained at a temperature of 450°–600° C. In the hydrogen generating catalysing chamber 23 the following reaction takes place:

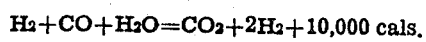

$$H_2+CO+H_2O=CO_2+2H_2+10{,}000 \text{ cals.}$$

The chamber 23 with which a heat interchanger 40 is associated is maintained at the required temperature by the exothermic heat of the reaction, after having first been raised to the reaction temperature by preliminary combustion of some of the water gas.

The gases from this chamber 23 are then passed through a gas scrubber 25 in which the carbon dioxide formed is removed, then through a gas purifier 26 into a third gas holder 27. The gas in this holder has approximately the following composition: hydrogen 98%; carbon monoxide 2%.

The remainder of the water gas from the second holder 22 is passed directly into a fourth gas holder 28. Hydrogen is then introduced into the fourth holder from the third holder in such quantity as is necessary to raise the ratio of $H_2:CO$ from 1:1 to 4:1, or any other desired proportion. When the plant is first started up, hydrogen is added to such an extent that the ratio of $H_2:CO$ will be 3–5:1. When this is obtained the ratio in the fourth holder 28 is maintained at $2:1=H_2:CO$. The excess hydrogen generated when the plant is first started up remains in the pressure system and is used to conduct heat from the catalyst mass in chamber 23 and to keep a uniform temperature therein.

From the fourth holder the mixed gases in the desired proportions, depending on the required final product, are passed to a compressor 28 where they are compressed to as much as 250 atmospheres. This pressure is varied in accordance with the nature of the product required, for example, in methanol synthesis the pressure would be 200 atmospheres, for light hydrocarbon synthesis (up to octane, for example) pressure would be approximately 18 atmospheres, for hydroxyl derivatives up to 150 atmospheres. From the compressor the mixed gases are passed into a high pressure storage tank 30. From this tank the gases are passed through a flow meter 31 and circulating pump 32 and through one small catalyser, or through a battery 33 of small catalysers. These small catalysers are kept at a temperature of 250–450° C. by exothermic heat evolved in the reaction. In these small catalysers (which are further described later herein) catalyst poisons are removed. From there the gases and vapours are passed through a pressure condenser 34 and trap 35 and on through one or a battery of large catalysers 36, passing a heat interchanger 39. These catalysers 36 are maintained at a temperature of 250° C.–450° C. The gases are circulated and if necessary recirculated over the catalyst mass in the catalysers, and they are then passed, still under pressure, through a pressure condenser 37 from which the liquid hydrocarbon or hydroxyl derivative products are drained to a receiver 38 and passed to a sump 41. The unconverted gases are then returned through pipe 46 and recirculated over the catalyst mass. If desired, the entire plant may be worked under pressure from the water gas generator to the final boosting compressor.

The electrical conditions (referred to later herein) prevailing within the large catalysers 36, render the gases chemically active by ionisation, the catalyst being employed for the purpose of turning the reaction in the desired direction. This electrical influence also determines the speed at which the reactions go forward. The space velocities employed in this portion of the process range from 50,000 to 100,000. For the production of formaldehyde, methanol is synthesised and passed to the receiver 38 and from there it is passed into a tank 42, in which it is maintained at a temperature of approximately 50° C. by means of a closed coil. Into this methanol batch a current of compressed air from a second compressor 43 is passed in such quantities as to ensure the formaldehyde catalyser chamber 44 being maintained at 450° C. approximately, by means of the exothermal heat evolved in the reaction. It is arranged that the ratio of methanol vapour to oxygen passed into the catalyser 44 shall be 1:32, this ratio being controlled by adjustment of the temperature of the methanol liquid in the tank 42. The air and methanol vapour mixture is then passed through the catalyser chamber 44 where the formaldehyde is formed, and from this chamber into the lower end of a plate fractionating column 45 where an aqueous solution of formaldehyde (approximately 40% formaldehyde, 60% H2O, 12% methanol) is run off. The recovered unconverted methanol is returned to the tank, and again passed through the catalyser chamber 44.

The formaldehyde catalyser chamber 44 (Fig. 1) for the production of formaldehyde may be as shown in Figs. 5 and 6. It consists of a number of copper tube gangs 54 set in concentric rings and supported between two copper end plates 55. Each tube gang is about 30" long and is fitted with a tight fitting glass tube 56 about 12" long and about ¾" diameter. In these tubes is placed a length of fine closely rolled gauze 57 (preferably of copper) about 5" long. The catalyst chamber is heated preliminarily to starting up by igniting the reacting gases. When the requisite temperature is reached, the temperature is maintained by exothermic heat evolved in the reaction. Each tube gang in the formaldehyde catalyser chamber consists of about 6–8 nested tubes.

Suitable structural designs of the small and large catalysers are shown in Figs. 2 and 4 respectively of the drawings. The first consists of a steel tube 33, preferably of non-ferrous metal, having the catalyst substance carried on a metallic gauze network 69 having relatively large clearance spaces between its folds or convolutions. The catalyst carriers are supported horizontally on a central tube piece 66, and the gas mixture has to pass actually through the catalyst to escape from the chamber. The outlet is down through the centre of the catalyst carrier support 66.

The gas mixture under a pressure head of about 250 atmospheres is passed via a cock 61 through a meter 31 (62A being a registering pressure gauge to facilitate control), to the small catalyser through a port 63. The catalyser is heated externally to a point between 200° and 450° C. 62 is a shaft drivable by a pulley 64 and passing through a stuffing box 65; it is keyed into the bottom end of a tubular shaft 66. The shaft 66 is fitted with perforated tubular arms 67 which are stopped (68) at their outer ends. The catalyst is deposited on metal gauze 69 which is wrapped round the arms 67, its convolutions being spaced apart in order to facilitate gas circulation. The catalysed gas which has passed into the tube of the shaft 66 is led out through a port 169 to the coil 70 of the condenser 71. The condenser coil 70 drains into a closed receptacle 35 in which the alcohols are collected. When it is required to fractionate to obtain the alcohols separately the condenser is run dry or is by-passed, and the vapours are led to a fractionating still.

The gases enter the chamber in such a way that they are kept in motion within the chamber. The chamber is heated, preferably externally, to a temperature of 250°–450° C. Thermocouple leads come from the catalyst bed and carriers so that the temperature at the catalyst surface will always be known. If electrical heating is used, the electric device is thermostatically controlled so that if the temperature drops below any desired minimum the heating device comes into action automatically. It also cuts out automatically when the temperature of the inside of the chamber has reached any predetermined maximum. The chamber is complete with a series of heat exchangers whereby the incoming gas mixture may be warmed if desired by the outgoing vapours and gases.

The large catalyser chamber 36 (Fig. 4) consists of a steel tube 47 into which is inserted a tight fitting lining 48, preferably of non-ferrous metal. Inside this is fitted the catalyst carrier which consists of two concentric gauze cylinders 49—50, preferably of copper, the volume contained between them being equal to one third of the total free inside volume of the catalyser chamber. Down the centre of the chamber an electrode 51 is placed, the negative side of the circuit being the wall of the chamber. If desired this wall may be coated with an ionizing agent such as radio-active substances or rare earth elements (for example caesium may be used). The wires from the electrode and the wall of the chamber are connected to a transformer which supplies the necessary potential difference between the two points, the voltage depending upon the distance between the electrodes. In an experimental practicing of the invention, 80,000 volts was found to be suitable in the case of electrodes separated by a distance of about one and one-half inches. The frequency employed may vary from 6,000,000 to 37,000,000 cycles per second depending upon the nature of the substance to be synthesised and the catalyst employed. For example, in the synthesis of light hydrocarbon fractions in the saturated chain series (from $C_5H_{12}$ to $C_8H_{18}$) the frequency employed would be of the order of 33,000,000 cycles per second. If desired, the catalyst and catalyst carrier itself may also be connected to the negative side of the circuit.

The ultra high frequencies herein employed exercise a double effect in promoting synthesisation of the gases or vapors within the field. Firstly, the rapidly moving streams of electrons between the electrodes destroy or tend to upset the electrical neutrality of the molecules with which the electrons collide; as a consequence, when a positively charged molecule approaches a negatively charged one, chemical interaction is practically instantaneous. Secondly, (and more importantly) working on the known fact that at any particular temperature different gaseous molecules vibrate in simple harmonic motion with definite periodicities which in almost all cases are of the order of several millions of oscillations per second, the field frequencies herein employed are such as will more or less closely synchronise, or conform (numerically), to the natural molecular periodicity of the particular gas under the conditions of treatment. The effect of this synchronised electronic bombardment is to rapidly enlarge the molecular orbits or to displace the molecules from their normal orbits, thus greatly increasing their chemical activity by comparison with that which would obtain in the absence of the synchronously alternating field. It is believed that best results would be secured by arranging the field alternations in precise synchronism with the natural molecular vibration of the gas or vapour under treatment; but where two or more gases are to be simultaneously dealt with by the one field (as in the present synthesis) experiment has shown that good results are obtained when the field frequency is of the order of an average value of the molecular oscillation frequencies of the several gases concerned. It would appear that this average field frequency sets up what may be termed a "beat effect" with the several molecular frequencies, and that once the molecular orbits are disarranged, the beat periodicity is sufficiently high to prevent the normal molecular orbits being re-established. The field frequencies herein specified comprise a range of average field frequency values suitable for the synthesisation of liquid hydrocarbons or hydroxyl derivatives thereof from hydrogen and carbon monoxide. Part of the required hydrogen and all of the required carbon monoxide may, of course, be drawn from a supply of water gas.

Heat may be applied by electric elements which are situated in the interior of the copper electrode and thermostatically controlled as in the case of the other chamber. If internal electric heating of this chamber is not desired, the incoming gases are passed through coils and heat exchangers 39 (Fig. 1) and thereby raised to the required temperature before entering the large catalyser. The coils are heated either electrically or by contact with gases coming out of the waste heat boiler, and the heat exchangers are heated by contact of the gases and vapours coming out of the catalyser 36 on their way to the pressure condenser. Gas enters through either one of the nipples 53 or 154, and leaves by the other. The catalyser 36 is so designed that all gases must pass actually through the catalyst bed, the flow being spread widely by the sleeve 52 to ensure perfect contact with the catalyst itself. The chamber is complete with heat exchangers mentioned above.

The first battery of small catalysers 33 (if the plant is worked in this way) are not fitted with an electrode and are subjected to no electrical tension whatever.

The plant may also be worked under pressure from the water gas generator onwards. In working the plant in this way the size of the plant is greatly reduced.

The working temperature of the catalyser chamber 23 is 450°–600° C. this point being chosen in order to combine rapid reaction with reasonably high conversion to the hydrogen and carbon dioxide side of the equilibrium. By employing excess steam the equilibrium is moved further over in the direction of the hydrogen and carbon dioxide, and about 2½ volumes of steam to 1 volume of water gas are used.

The apparatus (23) consists essentially of an internal chamber surrounded by flues, arranged in the form of heat exchangers, the temperature of the hydrogen generating chamber 23 being maintained once the action has commenced by the heat developed in the reaction, namely,

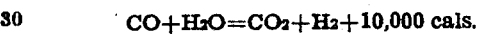

$$CO + H_2O = CO_2 + H_2 + 10,000 \text{ cals.}$$

When starting up the chamber 23 is first of all heated to about 500° C. by first burning water gas in the chamber itself. A mixture of water gas and steam in the proportions indicated above is then passed over the catalyst, where it is converted into a mixture of unchanged steam and a gas containing about 65% $H_2$, 30% $CO_2$, 2% CO, 3% $N_2$, and traces of methane ($CH_4$). Owing to the exothermal nature of the reaction the temperature at the exit of the chamber 23 is somewhat higher than 500° C. The emerging gases are passed through the heat exchangers, in the other compartments of which the fresh water-gas-steam mixture is passing on its way to the chamber and is thereby heated to nearly 500° C. The use of pressure accelerates this reaction and also diminishes the size of the plant necessary to produce a given volume of hydrogen in a given time. The catalyst for this reaction consists of a pure form of iron oxide, stimulated by the addition of small amounts of alumina or similar material, but otherwise free from sulphur, phosphorus, and other impurities. The catalyst should not be heated above 500°–600° C. prior to or during its use in the process.

The catalyst for use in the large and small catalysers may consist of zinc chromic acid oxide (obtained by the interaction of zinc oxide and chromic acid with subsequent reduction in hydrogen at a temperature of approximately 350° C.); reduced copper oxide; zinc oxide; mixtures consisting of copper oxide and zinc oxide; copper oxide, chromium sesquioxide, and manganous oxide; copper oxide, zinc oxide, beryllium oxide, and chromium sesquioxide, with ratios of Be:Cu 2–5:100, Mn:Cu 2–5:100 and 40:100, and small quantities of zinc oxide and chromium sesquioxide; copper oxide, cerium oxide, zinc oxide, and manganous oxide, with ratios Ce:Cu 2–30:100; copper oxide, zirconium oxide, beryllium oxide, and cerium oxide, with ratios copper:zirconium 100:3–10. These catalysts may also be used with activated charcoal in this process. All catalysts should be prepared by the precipitation of the hydroxide from mixed nitrate solutions with a boiling solution of sodium hydroxide. They may also be prepared by the thermal decomposition of some unstable copper salts of organic acids. The reduction in hydrogen must be carried out at low temperatures, about 200° C. All single component catalysts are sensitive to heat, indicating that mixed catalysts are preferable. All catalysts may be used in this process in conjunction with the high electric tension inside the catalytic chamber, except those catalysts used in the preliminary catalyst poison removing chambers.

Where the electric tension obtaining between the electrodes within the chambers 36 is of the order of from 60,000 to 100,000 volts, as in the synthesis of light hydrocarbons, a catalyst may be dispensed with, with only a relatively slight loss of efficiency, for best performance, however, one of the catalysts referred to above, is employed.

I claim:

1. A process for synthesising a member of the group consisting of hydrocarbons, alcohols, and mixtures thereof, which includes the step of passing a mixture of hydrogen and carbon monoxide through an alternating electric field whereof the potential difference is from 60,000 to 100,000 volts and whereof the frequency substantially synchronises with the natural molecular oscillation periodicities of the hydrogen and carbon monoxide under treatment, said field frequency being between 6,000,000 and 37,000,000 cycles per second whereby, in accordance with the magnitude of the said field frequency, the said hydrogen and carbon monoxide react to produce a corresponding member of the aforesaid group.

2. A process for synthesising a member of the group consisting of hydrocarbons, alcohols, and mixtures thereof, which includes the step of passing a mixture of hydrogen and carbon monoxide through a catalyst of the group consisting of a hydrocarbon-forming catalyst, an alcohol-forming catalyst and mixtures thereof, at a temperature of from 250° to 450° C., while subjecting the said mixture to the influence of an alternating electric field having a periodicity of from 6,000,000 to 37,000,000 cycles per second whereby, in accordance with the magnitude of the said field frequency, the said hydrogen and carbon monoxide react to produce a corresponding member of the aforesaid group.

3. A process for synthesising a member of the group consisting of hydrocarbons, alcohols, and mixtures thereof which includes the step of passing a mixture of hydrogen and carbon monoxide under a pressure of from 18 to 250 atmospheres through a catalyst of the group consisting of a hydrocarbon-forming catalyst, an alcohol-forming catalyst and mixtures thereof and which is maintained at a temperature of from 200° C. to 450° C., while subjecting the said mixture to the influence of an alternating electric field whereof the potential difference is from 60,000 to 100,000 volts and whereof the frequency is between 6,000,000 and 37,000,000 cycles per second whereby, in accordance with the magnitude of the said field frequency, the said hydrogen and carbon monoxide react to produce a corresponding member of the aforesaid group.

4. A process for synthesising a mixture of light hydrocarbons which includes the step of passing a mixture of hydrogen and carbon monoxide under a pressure of approximately 18 atmospheres through a hydrocarbon-forming catalyst which is maintained at a temperature of from 250° to 450° C., while subjecting the said mixture to the influence of an alternating electric field whereof the potential difference is from 60,000 to 100,000 volts and whereof the frequency is between 6,000,000 and 37,000,000 cycles per second.

5. A process of synthesising methanol which includes the step of passing a mixture of hydrogen and carbon monoxide under a pressure of approximately 200 atmospheres through an alcohol-forming catalyst which is maintained at a temperature of from 250° to 450° C. while subjecting the said mixture to the influence of an alternating electric field whereof the potential difference is from 60,000 to 100,000 volts and whereof the frequency is between 6,000,000 and 37,000,000 cycles per second.

PAUL XAVIER SPILLANE.